United States Patent [19]

Endō

[11] Patent Number: 4,723,360
[45] Date of Patent: Feb. 9, 1988

[54] ROTARY APPARATUS OF DIE UNIT FOR MANUFACTURING CORE LAMINATION ASSEMBLY

[75] Inventor: Yosihiko Endō, Ikeda, Japan

[73] Assignee: Kuroda Precision Industries Ltd., Kawasaki, Japan

[21] Appl. No.: 877,958

[22] Filed: Jun. 24, 1986

[30] Foreign Application Priority Data

Jan. 29, 1986 [JP] Japan .................................. 61-15802

[51] Int. Cl.⁴ ............................................ H05K 15/02
[52] U.S. Cl. ........................................ 29/732; 29/738
[58] Field of Search ................. 29/732, 736, 738, 596, 29/598

[56] References Cited

U.S. PATENT DOCUMENTS 3,210,824 10/1965 Zimmerle .
4,110,895 9/1978 Mitsui .

FOREIGN PATENT DOCUMENTS 36137 10/1984 Japan .

Primary Examiner—Carl E. Hall
Attorney, Agent, or Firm—Frank J. Jordan; C. Bruce Hamburg; Manabu Kanesaka

[57] ABSTRACT

A rotary apparatus of a successive feed die unit of a press apparatus includes an indexing apparatus and a frictional transmission apparatus for transmitting rotation to a lower rotatable die of the die unit for manufacturing a core lamination assembly. The indexing apparatus converts rotation inputted from a crank shaft of a press apparatus into intermittent rotation of a predetermined angle and outputs it to the frictional transmission apparatus. The frictional transmission apparatus has a changeable rotation speed without steps, inputs the intermittent rotation from the indexing apparatus, adds rotational volume of a predetermined skew angle in a positive or negative direction to the inputted intermittent rotation, and transmits the total rotation to the lower rotatable die.

6 Claims, 4 Drawing Figures

ROTARY APPARATUS OF DIE UNIT FOR MANUFACTURING CORE LAMINATION ASSEMBLY

BACKGROUND OF THE INVENTION

This invention relates to an improvement in a rotary apparatus of a die unit for manufacturing a core lamination assembly, and more particularly to a rotary apparatus of a successive feed die unit to collectively transmit intermittent rotation and other skew angle rotation to a lower rotatable die of the die unit.

In a conventional die unit for manufacturing a core lamination assembly for a motor of dynamoelectric machine components, a metal strip is stamped by a successive feed die unit, and predetermined numbers of the stamped core metal strips are stacked. However, lamination of the metal strips is not perfect because of variations in the thickness of each portion of the products due to the deflection of the thickness of metal strips which occurs during rolling. Accordingly, the parallel degree of upper and lower surfaces and the accuracy of the outside and inside diameters are deteriorated.

Therefore, in the past, countermeasures for removing the deflection of the thickness have included a method of rotating the metal strip or strips when the metal strips are stamped, by a predetermined angle of 90 or 180 degrees, as proposed in Japanese Patent Application Publications Nos. 43276/1972 and 18044/1976.

And, it is also known that the metal strip for lamination is rotated at a predetermined minute angle, e.g. a strip is skewed for elevating the electric characteristic in Japanese Utility Model Application Publication Nos. 53183/1978, 36137/1984 and 25318/1985. In Publication No. 36137/1984, it is disclosed that the metal strips are skewed by a step-motor. In this way, it is possible to stack by rotating lamination and simultaneous skewing thereof, but the control is very complicated and the proposed method is not practical.

In the conventional techniques stated above, the rotating lamination and skewing are carried out separately. Therefore, the both functions are not simultaneously completed, particularly, it is impossible to improve the efficiency of the products, since only one function is available in manufacture of a rotor for the motor of the dynamoelectric machine due to the method of progressive stamping and stacking of the metal strips in the conventional die.

Recently, a die apparatus has been proposed in Japanese Patent Application Laid Open No. 170534/1985. This apparatus has gear means between an indexing apparatus for input of rotation of a crank shaft of a press apparatus, and a rotatable die of a die unit, and it is available to simultaneously carry out rotational lamination and skewing of the metal strips. But, this apparatus cannot change skewing volume without steps, since the apparatus uses the gear apparatus, and the skew volume is limited due to the number of the teeth of the gear apparatus. Therefore, in practical use, there is a problem that the most desirable skewing volume is not given to carry the best electric characteristic and provide high precision in deflection of the outside and inside diameters of the products.

SUMMARY OF THE INVENTION

The invention provides a new and more efficient rotary apparatus of a successive feed die unit of a press apparatus for transmitting rotation to a lower rotatable die for manufacturing a core lamination assembly. The rotary apparatus comprises an indexing apparatus which inputs rotation from a crank shaft of the press apparatus, converts the rotation into intermittent rotation of a predetermined angle and outputs the intermittent rotation, and a frictional transmission apparatus, which is changeable in rotation speed without steps, inputs the intermittent rotation from the indexing apparatus, adds rotational volume of a predetermined skew angle in a positive or negative direction to the intermittent rotation, and transmits the rotation to the lower rotatable die. The frictional transmission apparatus has a variable speed apparatus for changing the skewing volume without steps which includes a V-shaped belt transmission apparatus of non-step variable speed type, and a driving pulley and a driven pulley which frictionally contact each other. The variable speed apparatus can change the skewing volume due to change of the ratio of the outside diameters of the pulleys.

The indexing apparatus outputs intermittent rotation of the predetermined angle to rotate the lower rotatable die, for instance, at 90 degrees or 180 degrees. And, the frictional transmission apparatus adds rotational volume of a predetermined skew angle in a positive or negative direction to the output of the intermittent rotation, and outputs the annexed rotation. Therefore, the die unit can receive the rotational lamination in skewed relation by the present invention.

Accordingly, an object of the present invention is to provide a rotary apparatus of a die unit for manufacturing core lamination assembly which overcomes the above stated disadvantages.

Another object of the present invention is to provide a rotary apparatus of a die unit for manufacturing core lamination assembly which simultaneously carries rotating lamination and skew in the die.

A still another object of the present invention is to provide a rotary apparatus of a die unit for manufacturing core lamination assembly which changes skew volume without steps, has a simple construction, is easily operated and is provided at a low cost.

Other objects and many of the attendant advantages of this invention will be readily appreciated as the same becomes better understood by reference to the following description.

BRIEF DESCRIPTION OF THE DRAWINGS

The accompanying drawings illustrate the preferred embodiment of the present application.

DETAILED DESCRIPTION OF PREFERRED EMBODIMENTS

Figure 1:
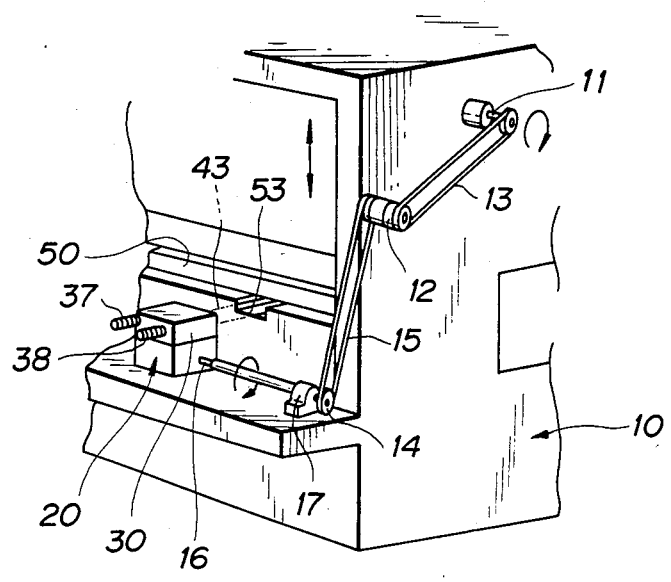
FIG. 1 is a schematic perspective view showing a rotary apparatus of a die unit connected to a press apparatus for manufacturing a core lamination assembly of the present invention.

Referring to the drawings, a preferred embodiment of the invention, as shown in FIG. 1, includes a principal components a rotary apparatus of a die unit 50 of a press apparatus 10 having an indexing apparatus 20 which controls rotational lamination, and a frictional transmission apparatus 30 which is mounted on the indexing apparatus 20 to control skewing volume.

The indexing apparatus 20 is generally available in the market, and is a driving power transmission apparatus to output intermittent rotation on an output axle when an input axle continuously rotates. As a typical apparatus, a roller gear type indexing apparatus of the Furguson Company in the U.S.A. is well known.

An input axle 16 of the indexing apparatus 20 which is mounted on a base projected from the press apparatus 10 is constructed to transmit rotation of a crank shaft 11 of the press apparatus 10 which drives the die unit 50 to the frictional transmission apparatus 30 through a timing belt or a chain. As shown in FIG. 1, the driving power transmission apparatus is disposed between a driving power source (not shown in the drawings) of the press apparatus 10 and the input axle 16. In this embodiment, a crank shaft 11 is provided to connect with the driving power source, a pulley 12 is rotatably disposed on an axle opposite the crank shaft 11, and a belt 13 is mounted between the crank shaft 11 and the pulley 12. And, a pulley 14 is attached to an end of the input axle 16 opposite the pulley 12 and a belt 15 is mounted between the pulleys 12 and 14. The input axle 16 is rotatably supported by a plumber block member 17 which is mounted on the projected base of the press apparatus, and the other end of the input axle 16 extends into the indexing apparatus 20.

Figure 2:
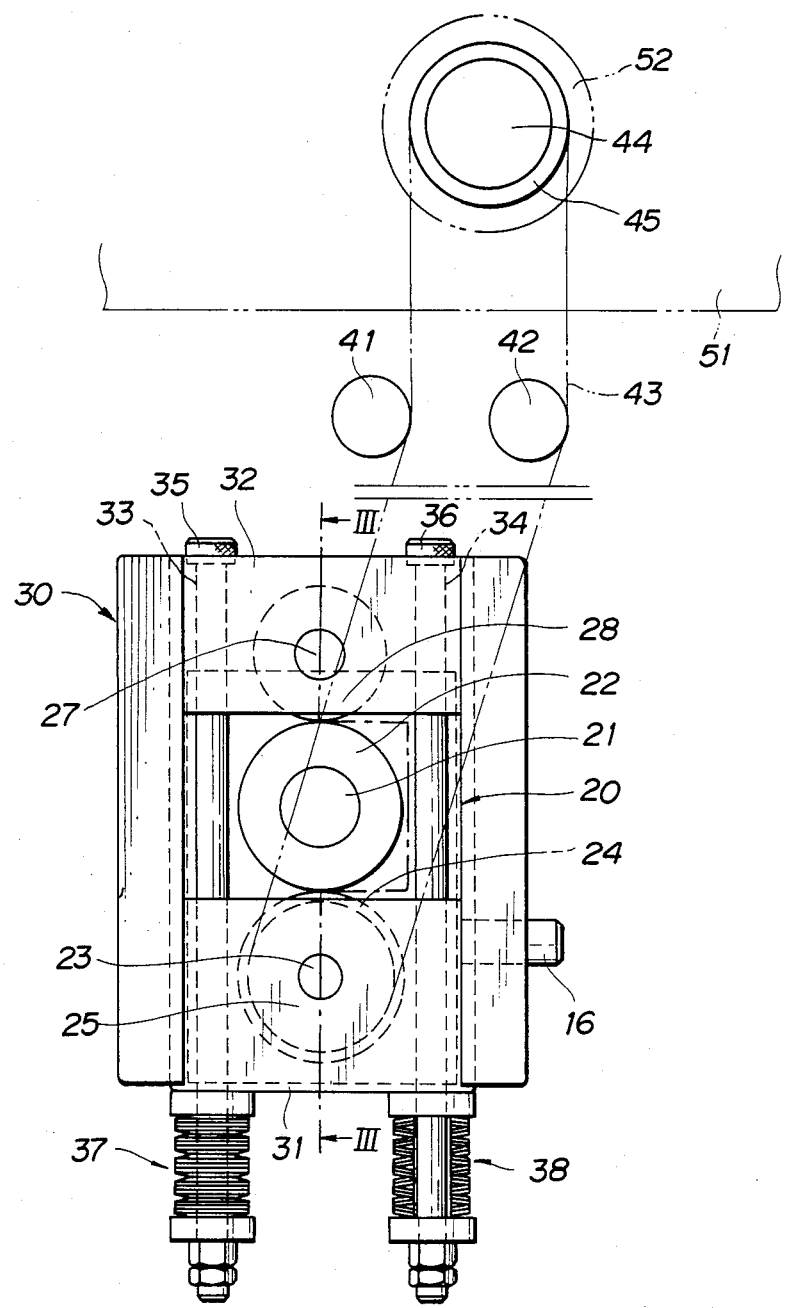
FIG. 2 is a schematic plan view of a frictional transmission apparatus in the rotary apparatus shown in FIG. 1.
Figure 3:
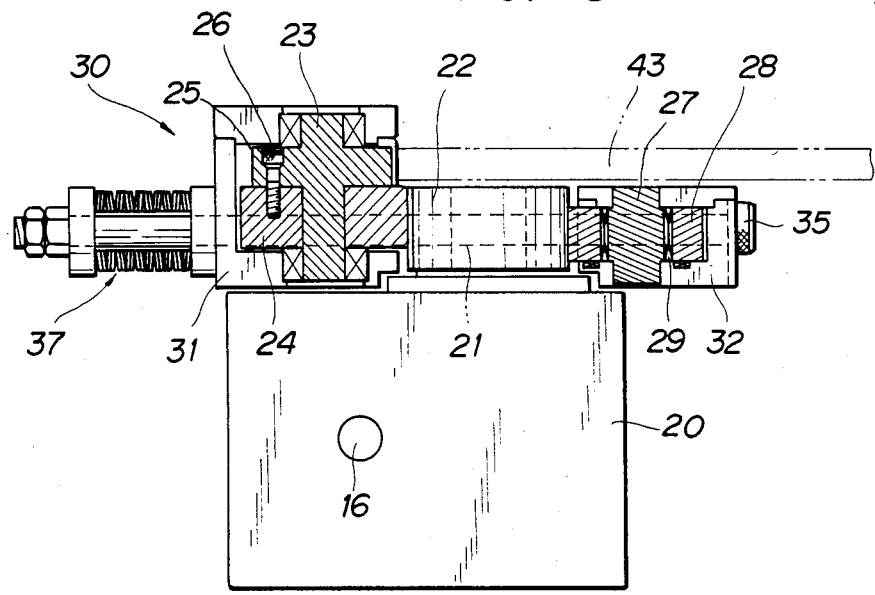
FIG. 3 is a cross sectional view along the line III—III in FIG. 1.

As shown in FIGS. 2 and 3, the frictional transmission apparatus 30 has a pair of first and second base plates 31, 32 through which holes 33, 34 are respectively provided. Bolts 35, 36 are respectively fitted to the base plates 31, 32 through the holes 33, 34. Pressing springs 37, 38 are respectively adjustably mounted on one end of the bolts 35, 36 projected from an outer end of the base plate 31, and are supported by each nut.

A driven pulley 24 is horizontally rotatably provided on a driven axle 23 to the base plate 31, and a gear 25 which has a predetermined diameter is provided on a periphery of the driven axle 23. The driven pulley 24 and the gear 25 are connected by a pin 26 and rotate together as one body. A pressing pulley 28 is rotatably provided on an axle 27 through a bearing 29 to the base plate 32.

A driving axle 21 which is operably connected to the input axle 16 is projected upon an upper surface of the indexing apparatus 20, between the base plates 31, 32 in the frictional transmission apparatus 30, and a driving pulley 22 is provided to the driving axle 21. The driving pulley 22 is frictionally engaged to both the pulley 24 and the pressing pulley 28.

The frictional transmission apparatus 30 and a lower rotatable die 52 of a lower die apparatus 51 of the die unit 50 are operably engaged by a timing belt 43 or a chain. That is, the lower rotatable die 52 has a worm wheel 45, and the timing belt 43 is engaged to the gear 25 and the worm wheel 45. A pair of tension pulleys 41, 42 are disposed to operably contact the timing belt 42 at an intermediate portion of the gear 25 and the lower rotatable die 52 to put the timing belt 43 in a tensioned condition. A hole 44 of the lower rotatable die 52 is provided within the portion of the worm wheel 45.

The base plates 31, 32 of the frictional transmission apparatus 30 are operably connected by the long bolts 35, 36, and the base plate 31 is pressingly pushed in the direction of the base plate 32 due to the pressing springs 37, 38. Therefore, by adjustment of the pressing force of the pressing springs, the pulley 24 and the pressing pulley 28 are respectively appropriately pushed into pressing contact with the driving pulley 22. As shown in the drawings, the bolts 35, 36 are placed parallel to a line drawn between axes of the three pulleys 22, 24 and 28. In this embodiment, a frictional pulley apparatus is used as the frictional transmission apparatus.

As stated above, the gear 25 which has a predetermined diameter is unitedly provided on the periphery of the driven axle 23, and the gear 25 is operably connected to the lower rotatable die 52 by the timing belt 43, since the gear 52 has teeth which correspond to the teeth of the timing belt 43. A chain can be used in lieu of the timing belt 43, and in this case, a sprocket wheel is used in lieu of the gear 25. And the tension of the timing belt 43 is controlled by two tension pulleys 41, 42.

In the rotary apparatus of the present invention, the rotation of the crank shaft 11 is transmitted to the input axle 16 of the indexing apparatus 20 as a continuous rotation, and is transmitted from the output axle 21 to the driving pulley 22 as an intermittent rotation at a predetermined indexing angle. The rotation of the driving pulley 22 is controlled by the driven pulley 24 in accordance with a variable speed ratio which is decided by the outside diameter ratio of the driving pulley 22 and the driven pulley 24. The rotation of the driven pulley 24 is transmitted to the lower rotatable die 52 through the gear 25 and the timing belt 43. Therefore, the rotation angle of the rotational lamination by the indexing apparatus 20 and the rotation angle to skew it by the variable speed of the driving pulley 22 and the driven pulley 24 are mixedly transmitted to the lower rotatable die 52.

In this embodiment, the frictional transmission apparatus can selectively use a pulley which can change the outside diameter without steps for one of the driving pulley 22 and the driven pulley 24.

Accordingly, given the above-stated construction, the output axle 21 can be intermittently rotated at a predetermined angle of 90 degrees or 180 degrees by the indexing apparatus 20, and further, the rotation which corresponds to the skew for one metal strip can be added to it by the frictional transmission apparatus 30.

In this embodiment, in order to change the skewing volume, only the ratio of the outside diameter of the driving pulley 22 fixed to the output axle 21 and the outside diameter of the driven pulley 24 is changed.

Figure 4:
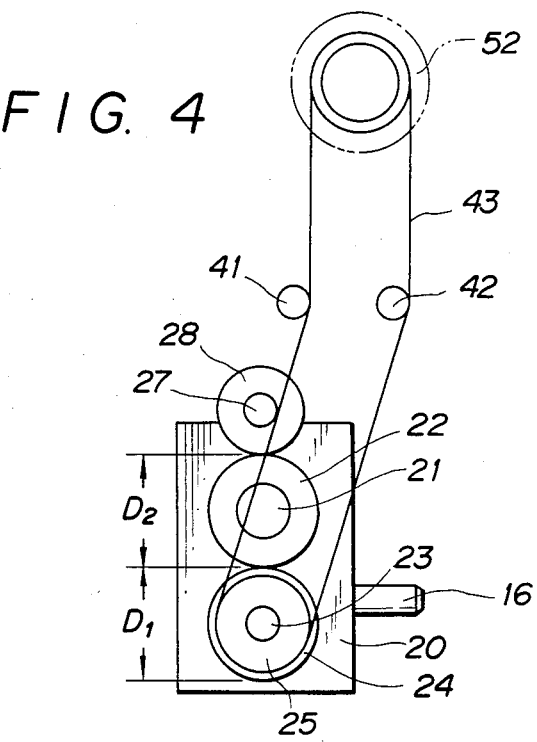
FIG. 4 is an explanatory illustration showing an operation of the rotary apparatus of the present invention.

In FIG. 4, an example is explained in accordance with an actual formula. The following formula is established:

$$180° \times D_2/D_1 = 180° + \alpha$$

in which the rotation volume of the rotational lamination is 180 degrees, the skewing volume for one metal strip is $\alpha$ degrees, the outside diameter of the driven pulley 24 is shown by $D_1$, and the outside diameter of the driving pulley 22 is shown by $D_2$. That is, in a case that $D_1$ and $D_2$ are the same size, the rotation is transmitted in the ratio of 1:1 and, accordingly, $\alpha = 0°$.

EXAMPLE

In case that $D_2 = 100$ mm, the rotation volume is 180°, and $\alpha = 0.6°$, $D_1$ is obtained from the above stated formula as follows:

$$D_1 = (180 + 0.6) \times 100/180$$

= 100.33

Accordingly, it is determined that the outside diameter of the driving pulley 22 should have a size of 100.33 mm.

As stated above, by the appropriate combination of the ratio of the outside diameters of the pulleys 22, 24 which substantially constitute the frictional pulley apparatus, the rotation volume of the rotational lamination and the skewing volume are changeable without any steps. In actuality, only the driving pulley 22 is changed to another pulley which has an outside diameter of the desired size. Therefore, the construction becomes simple. The above stated driven pulley 24 can be formed unitedly with the driven axle 23.

As explained above, the present invention is constructed such that the rotation volume of the rotational lamination and the skewing rotation which are converted from the output of the rotation of the press apparatus are simultaneously transmitted to the lower rotatable die by the indexing apparatus and the variable speed frictional transmission apparatus without any steps. Accordingly, the following advantages are obtained:

(1) It is possible to adjust the skewing volume without any steps due to the frictional transmission apparatus, i.e., it is possible to adjust the minute skewing rotation by frictional transmission rather than gearing way;

(2) It is possible to easily change the skew. In this case, only the driving pulley is changed. Therefore, the construction thereof becomes simple;

(3) No complicated special construction is used, therefore, the rotary apparatus of the present invention can be provided at a low cost; and (4) The precision of the core lamination of the products can be greatly improved, specifically, the parallel degree of the upper and lower surfaces. The right angle degree of the side faces, the deflection degree of the outside and inside diameters and the electric characteristic are respectively raised. Accordingly, the core lamination assembly as products suited to a high speed rotation motor in a dynamoelectric machine can be provided in accordance with the present invention.

The invention may be embodied in other specific forms without departing from its spirit or essential characteristics. The described embodiment is to be considered in all respects only as illustrative and not limiting, and the scope of the invention is, therefore, indicated by the appendant claims rather than by the foregoing description. All changes which come within the meaning and range of equivalency of the claims are to be considered within their scope. Consequently, it is recognized that may variations may be made without departing from the scope or spirit of the present invention.

I claim:

1. A rotary apparatus of a successive feed die unit of a press apparatus for transmitting rotation to a lower rotatable die of the die unit for manufacturing a core lamination assembly, comprising:

an indexing apparatus for inputting rotation from a crank shaft of the press apparatus, converting the rotation into intermittent rotation of a predetermined angle and outputting the intermittent rotation; and a frictional transmission apparatus having a changeable rotation speed without steps for inputting the intermittent rotation from the indexing apparatus, adding rotational volume of a predetermined skew angle in a positive or negative direction to the intermittent rotation, and transmitting the rotation the lower rotatable die.

2. The rotary apparatus of the die unit according to claim 1, wherein the frictional transmission apparatus has a driving pulley removably connected to an output axle of the indexing apparatus, and a driven pulley having at least one step and being rotated by frictional contact with the driving pulley, and wherein the skew angle is provided according to a ratio of outside diameters of the driving pulley and the driven pulley.

3. The rotary apparatus of the die unit according to claim 1, wherein the outside diameter of one of the driving pulley and the driven pulley and the skew angle are both changeable without steps.

4. The rotary apparatus of the die unit according to claim 1, wherein the indexing apparatus has an input axle which is connected to a power source of the press apparatus through a power transmission apparatus to obtain driving power from the power source, and the indexing apparatus is operably connected to the frictional transmission apparatus to transmit intermittent rotation converted from the driving power to the frictional transmission apparatus.

5. The rotary apparatus of the die unit according to claim 1, wherein the frictional transmission apparatus comprises:

a pair of first and second base plates having respective longitudinal parallel holes and disposed in spaced relation to each other;

a pair of bolts respectively inserted in the holes of the base plates and a pair of pressing springs for controllably pressing the base plates;

a driven pulley rotatably mounted on a driven axle provided on the first base plate, and a gear provided on the periphery of the driven axle;

a pressing pulley rotatably mounted on an axle provided on the second base;

a driving axle having an upper portion projecting from an upper surface of the indexing apparatus between base plates and a lower portion operably connected to an input axle of the indexing apparatus; and a rotatable driving pulley engaging the projected upper portion of the driving axle and frictionally engaged to the driven pulley and the pressing pulley.

6. The rotary apparatus of the die unit according to claim 1, wherein the lower rotatable die of the die unit has a worm wheel, and further comprising a timing belt engaged between the worm wheel and the driven pulley of the frictional transmission apparatus, and tension pulleys disposed at intermediate portions adjacent the timing belt for maintaining the timing belt in a state of tension.

* * * * *

UNITED STATES PATENT AND TRADEMARK OFFICE
CERTIFICATE OF CORRECTION

PATENT NO. : 4,723,360
DATED : February 9, 1988
INVENTOR(S) : Yosihiko Endo

It is certified that error appears in the above-indentified patent and that said Letters Patent is hereby corrected as shown below:

In column 6, line 4, delete "having a change-";
line 5, delete "able rotation speed without steps"; and
line 8, add after "angle" --which is changeable without steps--.

Signed and Sealed this

Thirteenth Day of May, 1997

BRUCE LEHMAN

Attest:

Attesting Officer

Commissioner of Patents and Trademarks